W. ESTY.

AUTOMATIC FIRE EXTINGUISHER.

APPLICATION FILED MAY 5, 1903.

Reissued Jan. 2, 1912.

13,347.

Witnesses:

Arthur G. Randall

Edith J. Anderson

Inventor:

William Esty by S. McLeod Calver & Randall

Attorneys.

UNITED STATES PATENT OFFICE.

WILLIAM ESTY, OF LACONIA, NEW HAMPSHIRE, ASSIGNOR TO ESTY SPRINKLER COMPANY, A CORPORATION OF NEW HAMPSHIRE.

AUTOMATIC FIRE-EXTINGUISHER.

13,347. Specification of Reissued Letters Patent. Reissued Jan. 2, 1912.

Original No. 696,884, dated April 1, 1902, Serial No. 459,676. Application for reissue filed May 5, 1902. Serial No. 106,095.

*To all whom it may concern:*

Be it known that I, WILLIAM ESTY, of Laconia, in the county of Belknap and State of New Hampshire, have invented certain new and useful Improvements in Automatic Fire-Extinguishers, of which the following, taken in connection with the accompanying drawings, is a specification.

My invention relates to automatic fire extinguishers or sprinklers, and it consists in certain novel features of construction, arrangement and combination of parts which will be readily understood by reference to the description of the drawings and to the claims hereinafter contained and in which my invention is clearly pointed out.

Figure 2:
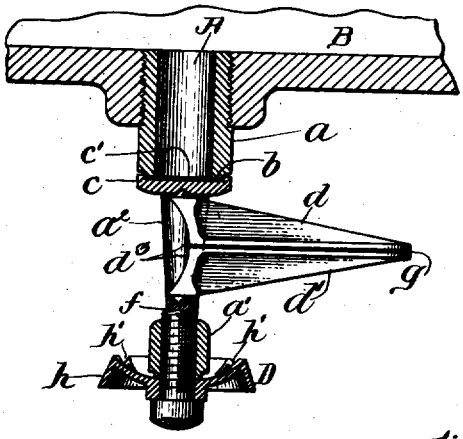
Figure 1:
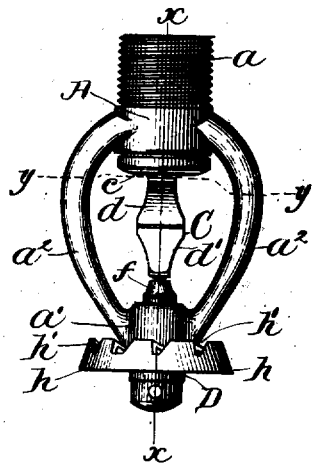
Figure 6:
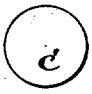
Figure 3:
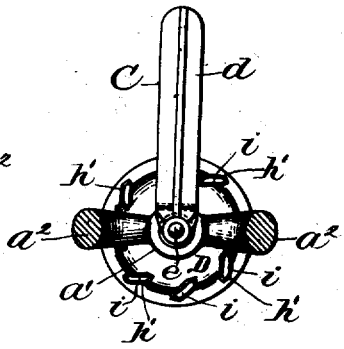
Figure 5:
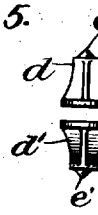
Figure 4:
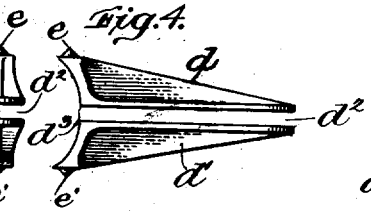

Figure 1 of the accompanying drawings is a view in elevation of a device embodying my invention. Fig. 2 is a view of the same in vertical section on line $x$—$x$ in Fig. 1, and showing also a small portion of the water-pipe in which said device is set, said portion of pipe being also represented in section. Fig. 3 is a sectional plan of the same, the cutting plane being on line $y$—$y$ in Fig. 1. Fig. 4 represents side elevations of the two parts of the support for the discharge valve before said parts have been secured together by the easily fusible solder. Fig. 5 is a view in end elevation of said parts under the same conditions. Fig. 6 is a view in plan of the removable seating-disk.

In the drawings, A is a stirrup-like casting, comprising the hubs $a$ and $a'$, and the two ties $a^2$ $a^2$ by which the hubs are connected together, as shown. The hub $a$ has formed thereon a male screw-thread, by which it is secured in position in the pipe B; it has an opening through the same for the discharge of water from said pipe B; and it has formed on its lower end a seat $b$ to receive the valve $c$, as shown in Figs. 1 and 2. The valve $c$ has formed in its upper surface a shallow circular recess, in which is fitted a disk $c'$ of mica, for the purpose of preventing the valve from sticking to its seat when its support has been removed, and from thus rendering the apparatus inoperative. I make the said disk of mica, because the latter is absolutely non-corrodible, which quality, together with its laminated structure, by virtue of which it is easily divided and sub-divided almost without limit, renders it peculiarly adapted for use as a packing for the valves of automatic fire-extinguishers or sprinklers, inasmuch as, even if the surfaces of the metal seat and valve should corrode, the valve would be readily removed by the pressure of the water in the pipe when the valve-support is removed by the fusing of the soft metal connecting its parts; because, if the mica should be made to adhere to the seat and valve by said corrosion, the pressure of the water would cause the mica to be split to liberate the valve, and the part adhering to the seat would be burst, thus permitting the water to escape. The valve is held in contact with its seat by the support C, which is made up of two triangular pieces or members $d$ $d'$. The latter are provided, respectively, with the conical centers $e$, $e'$, the first thereof to fit into a recess in the under surface of the valve $c$, and the other to fit into a recess in the upper end of the screw-step $f$. The said screw-step is threaded in the hub $a'$, and serves as a rest for the lower part of the valve-support. By screwing it in, the valve $c$ is pressed hard against its seat.

The contiguous or opposing surfaces $d^2$ of the pieces or members $d$, $d'$, extend transversely with relation to the valve and valve-support, and the said pieces or members are secured together by a solder $g$ that is applied between these surfaces. The said solder is of a kind which is fusible at or about 160 degrees, or other predetermined low temperature. The pieces or members $d$ and and $d'$ preferably are made exactly alike, in order that they may be cast from the same pattern, and also in order to render the valve support perfectly symmetrical in shape; but this is not essential to my invention. They need not necessarily be made triangular in shape, and the two need not be like unto each other. In the form of the pieces or members that is represented in the drawing, each thereof is T-shaped in vertical cross-section, it having a horizontal web extending lengthwise thereof, and a vertical web that is joined to the horizontal web at midwidth of the latter. The flat outer sides of the horizontal webs constitute the proximate or opposing surfaces of the pieces or members $d$ and $d'$, and are of considerable area. The contact of the said faces begins at a point a little to one side, or offset with relation to the vertical line which passes through the centers *e e'*, that is to say, the line of thrust. The illustrated construction of the valve-support secures strength and rigidity, these qualities being due chiefly to the vertical webs aforesaid, which stiffen and strengthen the said pieces or members. The latter are light and have no heavy or thick mass of metal present at any point, this last feature being particularly important in the case of the horizontal webs, and enabling them to heat through quickly so as to insure the speedy fusing of the solder or other uniting material by an increase of temperature. I contemplate in some cases omitting the vertical webs.

A serious defect of prior sprinklers of this class is the fact that the exposed portions of fusible metal or solder become entirely incrusted or covered by the products of corrosion of the metal of the valve-support; that is, by the formation of verdigris or other products of corrosion, which is non-conductive, and by shielding the solder from the heat prevents speedy fusion of the solder when a fire breaks out. In my extinguisher or sprinkler, inasmuch as the solder is exposed chiefly or wholly at the edges of the horizontal webs, and as the said edges are comparatively thin, there is very little opportunity for incrustation to form over the solder. There also is a reduced liability of the said edges becoming bound together by the said incrustation in a manner which will prevent the two parts, halves, or members of the valve-support from separating.

The free end of the valve-support projects directly outward, and thereby is exposed fully to the influence of ascending heated air, and also is removed from liability to become wetted and chilled by the first jet of water which escapes from the nozzle as the valve opens.

As will be apparent, the described form of valve-support is constructed on the principle of a toggle-joint. It consists essentially of two lever-like pieces or members, one of which more directly sustains the valve, while the other thereof may be described as constituting a support for the first, the said pieces or members having a fulcrum-point, or knuckle, that is offset from the direct line of thrust, and also having leverage-securing arms extending outwardly from said fulcrum-point, the said arms being held together by readily fusible solder, and the contiguous or opposing surfaces of the said pieces or members to which the solder is applied being formed transversely with relation to the line of thrust. The inner ends of the pieces or members *d, d'*, are inclined or otherwise so formed as to locate the fulcrum-point aforesaid to one side laterally of the direct line of thrust, as aforesaid. Under the pressure which occurs while the sprinkler is in use, the members are squeezed together at their inner ends, while at their outer ends they tend to pull apart, thus exerting a continuous pull on the solder. The moment the solder becomes sufficiently fused to permit movement, the said outer ends separate, and, owing to the increased ratio of the movement of the outer ends, the said outer ends instantly become spread apart to such an extent that they cannot re-unite in the case of chilling of the solder. When the solder or other fusible material uniting the pieces or members *d d'* becomes fused, and thus affords opportunity for the said pieces or members to separate under the pressure of the water upon the valve, the said pieces or members will turn relatively to each other on the fulcrum-point, splitting apart from their outermost tips to the said fulcrum-point, thereby breaking apart and releasing the valve so as to permit a full discharge of water from the nozzle.

The arrangement of the two pieces *d* and *d'* one on top of the other in the line of the pressure transmitted through the valve, with their bearing surfaces transversely disposed with relation to said line of pressure, relieves the solder of the greater part of the dead strain which is exerted upon and through the valve-support, such part being simply transmitted through the valve-support to the screw *f* upon which the latter rests, and thus to the yoke or frame constituted by the casting A.

D is a sprinkler disk or cup mounted loosely upon the screw *f* below the hub *a'* so as to be revoluble thereon, said sprinkler disk or cup having its main body made concavo-convex, and being provided around its outer edge with the petticoat-like flange *h*, the outer surface of which forms an acute angle with the outer portion of the upper or concave surface of said cup. The angular ridge formed by the junction of said surfaces has cut through it a series of grooves or notches *h'*, which are arranged oblique to radial lines, or tangential to a circle concentric to the axis of said cup, and are of sufficient depth to form openings *i* through said cup between said petticoat-flange and the concavo-convex portion of the cup, as shown in Figs. 1 and 3.

The operation of my invention is as follows:—Water-supply pipes as B being arranged in the room to be protected, near the ceiling in a well-known manner, a series of my extinguishers or sprinklers are applied to openings in the peripheries of said pipes so as to project therefrom. The pipes B will be in direct communication with the street main or other source of supply having the requisite head to give the desired pressure in any well-known manner. If a fire is started in the room, so that the temperature of the room is raised above a predetermined point, the solder $g$ between the pieces $d$ $d'$ of the valve-support C will be fused so as to present no obstacle to the separation of said parts, whereupon the pressure of the water in the pipe B, acting upon the valve $c$ and through it upon the center $e$ in a line at one side of and removed from the inner contiguous corners $d^3$ of said pieces, will cause said parts $d$ and $d'$ and the valve $c$ to fall to the floor, when the water escaping from the pipe B through the orifice in the hub $a$ is thrown with considerable force against the concave surface of the cup D, and in escaping therefrom a portion is forced against the outer oblique sides of the notches $h'$, thereby causing said sprinkler cup to revolve about the screw $j$, while other portions find their way through the openings $i$ and striking the inner inclined surface of the petticoat flange are deflected therefrom in a great variety of directions, thus causing a most thorough breaking up and scattering of the water in all directions, so as to fall to the floor in a shower of spray and cover a very considerable area, including the space directly beneath the sprinkler. This invention will operate equally well whether the discharge of water is downward or upward, but when the discharge is upward, I prefer to reverse the sprinkler cup relative to the valve, so that the water discharge from the orifice will strike the convex side of said cup instead of the concave side.

The horizontally extending portions of the pieces or members $d$ and $d'$ united by the fusible solder, constitute leverage-securing arms or portions extending laterally from the inner ends of the said pieces or members. This construction enables the fusible solder to operate to the best advantage in resisting the strains resulting from the pressure on the valve.

It will be seen that the upper half or member of what is herein termed the "valve-support" consists essentially of a valve-supporting thrust arm having an inclined inner end, and having also a leverage-securing portion extending laterally at an angle to the said inner end. The lower member or half of the so-called valve-support constitutes a laterally extending support, to the proximate surface of which the under surface of the said leverage-securing portion is soldered.

In consequence of the projection of the free end of the valve-support outward entirely beyond the frame of the sprinkler and the edge of the sprinkler-disk or cup, it consequently is exposed to contact with external objects and to blows or pressure. For instance, the said free end is liable to be struck by a brush or broom in the hands of a workman engaged in dusting or cleaning around or in the neighborhood of the extinguisher or sprinkler. It is for this reason that the valve-support is formed with centers $e$, $e'$ which permit the valve-support to turn freely under a blow or pressure; thereby liability or injury is obviated.

I claim as my invention:—

1. In an automatic fire extinguisher, the combination with a water-supply pipe provided with a discharge orifice and a valve seat surrounding said orifice, of a valve for closing said orifice, a valve-support made in two parts secured together by a metal that will fuse at a low temperature, and a sprinkler-cup having its main body made concavo-convex and provided at its outer edge with a flaring petticoat-like flange, and also having a series of oblique notches cut through its raised angular ridge and forming openings between the petticoat-like flange and the concavo-convex portion of said cup, substantially as described.

2. In combination with the supply-pipe B, the stirrup-like casting A set in an opening in said pipe and provided with a discharge orifice through its hub $a$, and with the seat $b$ surrounding said orifice, the screw step $f$ mounted adjustably in the hub $a'$, the valve $c$, the mica disk $c'$, the valve-support C made in two parts secured together by a metal that will fuse at a low temperature, and the concavo-convex sprinkler-cup D provided with the petticoat-like flange $h$, the oblique notches $h'$, and the openings $i$, substantially as described.

3. In an automatic fire extinguisher, the concavo-convex sprinkler cup D provided with the annular pendent flange $h$, the series of notches $h'$, and the openings $i$, substantially as described.

4. In combination with a supply-pipe provided with a discharge orifice, a seat surrounding said orifice, a valve for closing said orifice, a support for said valve, constructed and adapted to be distintegrated when the temperature of the room is raised above a predetermined point, and an adjustable step for said support, of the concavo-convex cup D provided with the annular flange $h$, the series of notches $h'$, and openings $i$, loosely mounted upon a suitable bearing, and adapted to be reversed to present either its concave or convex side toward the outflowing jet of water, substantially as described.

5. A valve-holding device for automatic sprinklers comprising two opposed substantially counter-part lever members one thereof resting upon and supported by the other, the said members constructed and arranged to fulcrum or swing upon each other at a point closely adjacent but normally outside the line of thrust and connected by a fusible connection at the resistance side of the fulcrum along a line at right angles to the line of strain.

6. In an automatic sprinkler, the combination with an outlet, of a valve for closing the outlet, a valve-holding device interposed between said valve and the frame of the sprinkler, said device being composed of two opposed lever members arranged to bear upon and fulcrum upon each other at a point closely adjacent the line of thrust but normally outside such line substantially midway between the bearing points on the valve and frame respectively, and a fusible connection acting upon the lever members at the resistance side of the fulcrum along a line extending outward from the fulcrum.

7. In an automatic sprinkler, the combination with the outlet of a valve for closing the outlet, and a valve-holding device composed of two lever-members of similar form which fulcrum upon each other adjacent but outside the line of thrust, and substantially midway between the bearing-points on the valve and frame, respectively, the said members being provided with lever-arms extending laterally beyond the fulcrum and connected by a fusible connection along a line extending outward from the fulcrum.

In witness whereof I hereto affix my signature in the presence of two witnesses.

WILLIAM ESTY.

Witnesses:

GEORGE W. SHERWELL,

LESTER A. DEARTH.